March 30, 1965 YÜAN-HENG DSCHEN 3,176,286
APPARATUS FOR MONITORING BEARINGS
Filed May 17, 1963 2 Sheets-Sheet 1

$$c = \frac{c_S \cdot c_W}{c_S + c_W}$$

INVENTOR.
Yüan-Heng Dschen

United States Patent Office 3,176,286
Patented Mar. 30, 1965

3,176,286
APPARATUS FOR MONITORING BEARINGS
Yüan-Heng Dschen, Baden, Switzerland, assignor to Aktiengesellschaft Brown, Boveri & Cie., Baden, Switzerland, a joint-stock company
Filed May 17, 1963, Ser. No. 281,304
Claims priority, application Switzerland, May 22, 1962, 6,144/62
9 Claims. (Cl. 340—282)

The present invention relates to an apparatus for the monitoring of bearings and especially of gas-bearings as are, for example, employed in reactor techniques.

In the development work undertaken, both on gas-lubricated bearings and on operation of machines equipped with gas bearings, equipment for the detection and indication of metallic contact as between shaft and bearing has shown itself to be indispensable as this latter occurrence can be a direct cause of damage to the machine. The apparatus recognized till now for the detection of metallic contact in bearings operates in accordance with the principle of galvanic currents passing through shaft and bearing whereby the illumination of a small lamp on metallic contact taking place or similarly a voltage drop occurring over a resistance serves as indication of the critical condition. The input of electric currents to the shaft requires, however, contact points with the latter, e.g. brushes made from special copper-graphite in contact with a needle mounted centrally on the shaft. This method has shown itself to be inadequate, however, in view of the unavoidable material wear and the inconstancy of the contact resistances. Additionally with capsuled, i.e. enclosed, machines it does not lend itself to application, or leastwise only with difficulty.

Attempts have also already been made to determine the magnitude of change in the lubrication gap between shaft and bearing with capacitive measuring devices. Nonetheless, this method can only be used in special cases as a contact indicator, namely, only if the measuring device is situated at the same height as the load surface of the bearing and if the shaft touches the bearing just at this point; this is not necessarily the case though. Furthermore, there is a known arrangement whereby capacitive measurement of the surface form, and of the clearance of a rotating body, takes place with the aid of two fixed electrodes. With this arrangement, the two fixed electrodes are screened off from one another whereby an alternating voltage of constant amplitude and frequency is fed to one of the electrodes and, after amplification, the voltage arising at the second electrode due to the capacitive coupling regulated by the rotating body is led to an indicating instrument.

This arrangement does indeed allow for the determination of the distance of the shaft from two electrodes, but does not, however, permit the monitoring of bearings in the sense according to the invention. Additionally, a capacitive measuring method is known with which a fixed electrode is used, the surface of a rotating body then serving as backing electrode. To determine the separation there is used the capacitance changing with varying separation and existing between the fixed electrode and the rotating body which serves as backing electrode. With this known method, it is a disadvantage that measurement of the current input to the rotating body is required, this involving up till now the use of contact points, e.g. brushes. Furthermore, this method of measurement does not permit the fulfilment of the present task within the desired limits of simplicity.

Attempts have also been made to determine a relationship between the shaft eccentricity and the total capacitance between shaft and bearing. This method too, however, has been found lacking for introduction into practice.

An object of the invention is to provide an improved arrangement for detecting any metallic contact between a rotating shaft and the bearings in which it is supported without the necessity of having to provide any current-carrying conductor connected directly to supply current from a source to the shaft. This, thus eliminates the necessity for providing any rotating contact element. Another object is to provide a dependable apparatus for the monitoring of shaft bearings which gives accurate indication as to any metallic contact between the normally spaced surfaces of the shaft and bearings. More particularly, the improved monitoring apparatus, according to the invention, utilizes the capacitances constituted by the shaft surface and the surfaces of the individual bearings, and wherein these capacitances are so connected that the capacitance between one, or a group of bearings, and another, or another group of bearings, is equivalent to the resultant capacitances of two series-connected capacitances.

The complete unit is such that a capacitor will become short-circuited on metallic contact being established between the shaft and any one of the bearings, resulting in a substantial change in the over-all capacitance of the circuit. The problem of monitoring metallic contacts in the bearings is thus reduced to detection of the change in resultant capacitance.

The foregoing as well as other objects and advantages inherent in the inventive concept will become more apparent from the following description of several representative embodiments and from the accompanying drawings which illustrate them. In the drawings.

Figure 1:
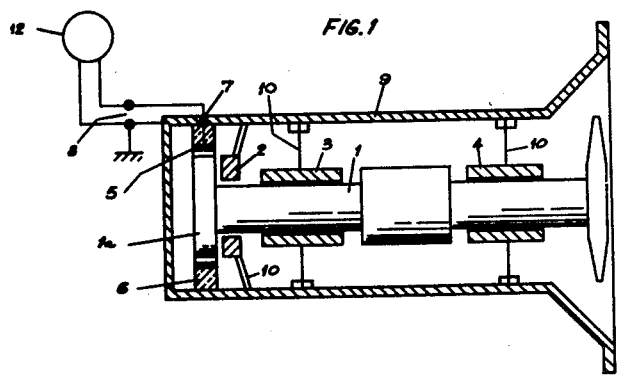
FIG. 1 is a view in central longitudinal section of one embodiment of the invention wherein the shaft is carried by two longitudinally spaced sleeve, i.e. journal, bearings and one thrust bearing.
Figure 2:
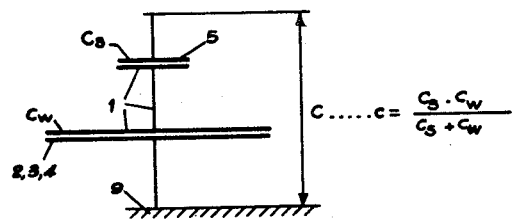
FIG. 2 is an electrical schematic illustration of the arrangement of FIG. 1 showing the various capacitors involved and their circuit connections.

With reference now to FIGS. 1 and 2, there is somewhat schematically represented a capsuled, gas bearing-supported turbo-machine which includes a high-speed shaft 1 having a flange 1a at one end thereof. Two longitudinally spaced journal bearings 3 and 4 support the main part of the shaft for rotation and a thrust bearing 2 is associated with the end flange 1a. In accordance with the invention, the purpose of which is to monitor, i.e. detect, contact between the shaft and any of the bearings 2, 3 or 4, the flange part 1a of the shaft is surrounded by an annulus 6 of electrically non-conducting material having a metallic layer 5 applied to its inner surface. The air gap between the metallic layer 5 and the periphery of shaft flange 1a as well as the breadth of the metalic layer 5 conforms especially to the desired electrical capacitance. An insulated wire 7 is connected to the metallic layer 5 and led to the outside through the turbine casing 9. Bearings 2, 3 and 4 are all connected galvanically with casing 9 by means of electrical connections 10 and the casing 9 is grounded electrically. Thus, bearings 2, 3 and 4, together with shaft 1 establish three parallel connected capacitors.

Furthermore, a monitor instrument 12 connected to terminals 8 which are connected to lead wire 7 and casing 9 respectively, is provided. In normal, trouble-free operation of the machine, shaft 1 floats on journal bearings 3 and 4 and on thrust bearing 2. In this way shaft 1 is insulated from the bearings by the electrically non-conducting lubricant e.g. gas of the bearings. The dielectric constant of the lubricant and the geometry of the bearing determine the capacitance as between shaft and bearing. In FIG. 2 this capacitance of bearings 2, 3 and 4 is designated with $C_w$. The capacitor formed by ring 5 and the shaft which is connected in series with capacitance $C_w$, as related to the grounded casing 9, possesses capacitance $C_s$. The capacitance between insulated ring 5 and machine casing 9, which is measured at the terminals 8, thus comprises two capacitances $C_s$ and $C_w$ connected in series. In the event the shaft makes a contact with any one of the bearings 2, 3, or 4 and thus short-circuits the corresponding capacitor, the resultant capacitance of the capacitors connected in series is changed, this then being indicated by the monitor instrument connected to terminals 8.

Capacitance $C_s$ is so dimensioned that the relative change in capacitance lies in the indicating range of the monitor instrument employed e.g. an electronic type. This change in capacitance is converted to a change in voltage by a corresponding measuring instrument which for its part can release a sensitive relay impulse and thereupon actuate a visual or acoustic signal.

Figure 3:
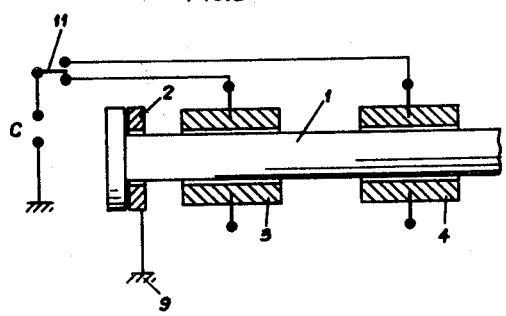
FIG. 3 is a view similar to FIG. 1 but with a somewhat different arrangement of the various capacitors which enables one to determine which particular bearing has developed contact with the shaft. In this embodiment, the two sleeve bearings can be parallel connected together or separately connected into the circuit by means of the switch, leaving the other one open-circuited.
Figure 4:
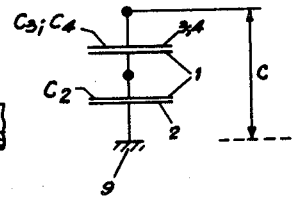
FIG. 4 is an electrical lay-out of the condensers applied to the capacitor arrangement of FIG. 3.

In the case that the particular bearing has to be determined with which shaft contact is taking place, a layout arrangement as given in FIG. 3 is of greatest advantage in application. In FIG. 3 thrust bearing 2 is connected to the earthed machine casing 9 and journal bearings 3 and 4 are insulated from casing 9. To be measured then is either the capacitance between bearing 3 and machine casing 9 or, by actuating switch 11, the capacitance between bearing 4 and machine casing 9. The resultant capacitance is likewise comprised of two series-connected capacitances. These are namely that between bearing 3 and shaft 1 or between bearing 4 and shaft 1, given as $C_3$ and $C_4$ respectively, as well as that between shaft 1 and bearing 2 given as $C_2$. These capacitances are indicated in FIG. 4.

Should contact occur between shaft 1 and bearing 2, only capacitance $C_3$ or, corresponding to the position of switch 11, capacitance $C_4$ is measured and conversely, on contact between shaft 1 and bearings 3 or 4, respectively, only capacitance $C_2$. The monitor instrument then shows the respective changes in capacitance corresponding to the individual cases.

Figure 5:
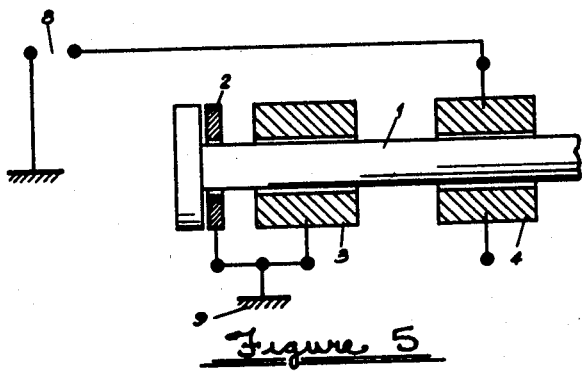
FIG. 5 is a view similar to FIG. 3 but with a still different arrangement of the various capacitor.
Figure 6:
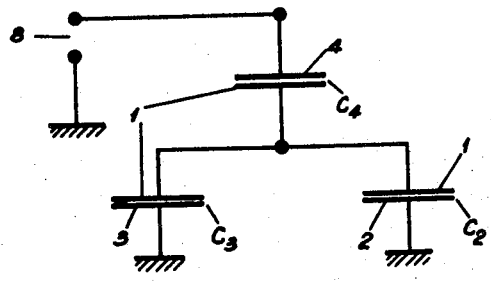
FIG. 6 is an electrical lay-out of the capacitor as connected in FIG. 5.

With the embodiment according to FIG. 5 the capacitors formed by thrust bearing 2 and journal bearing 3 are parallel connected and grounded at 9, whereas, the capacitor formed by journal bearing 4 is connected in series with the two other bearing capacitors 2 and 3. As in practice the capacitances $C_2$, $C_3$ and $C_4$ shown in FIG. 6 of the three capacitors 1-2, 1-3, and 1-4, are of the same order of magnitude, there results on short-circuiting of a bearing capacitor a massive change in the resultant capacitance, this then allowing the use of relatively simple, robust and cheap instruments for the indication of bearing contact with shaft 1.

With gas-lubricated bearings, compressed gas is fed in at start-up and shut-off in order to raise the shaft from the bearings at standstill and at low speeds. For this reason, the bearings are provided with corresponding openings and compressed-gas connections. Tests have demonstrated that, during the jacking-up with compressed gas at start-up and run-down and also during changes in speed, for short periods contact can occur which does not give rise to damage. Should the monitor instrument be used as regulator then, the latter may function as a counting meter for the impulses per unit-time. This meter only comes into action if a certain maximum number of contacts occur in a preselected time interval.

The apparatus as described for the detection of metallic contact as between a rotating shaft and its bearing has the following advantages:

It requires no contact point on the rotating shaft, but rather a capacitor-surface enclosing the shaft annularly, the capacitance of which latter may assume an unusually large value in comparison to the normal electrodes employed for capactive measurement. Therefore, this apparatus is not susceptible to parasite-capacitance effects.

The presence of metallic contact between shaft and bearing is not detected by the passage of galvanic currents between shaft and bearing but by the change in capacitance of series-connected capacitors.

In practical operation, the change in capacitance of the individual capacitors resulting from a change in shaft-clearance at the bearing concerned is so small in comparison with the change in capacitance on short-circuiting of this condenser that the monitor-instrument gives an unmistakable indication of contact between shaft and the bearing or casing.

The application of the developed apparatus is not limited to turbo-machines equipped with gas-bearings but can also be employed with other types of bearings as long as the lubricant used is not electrically conducting and possesses a constant dielectric constant.

I claim:

1. Apparatus for monitoring bearings to detect any metallic contact between a rotatable electrically conductive shaft and the bearing which normally supports said shaft with a non-conductive film of lubricant therebetween which comprises at least two capacitors connected in series and a capacitance change detector electrically connected across said series connected capacitors, each said capacitor including as one element thereof a peripheral portion of said electrically conductive shaft which thereby electrically interconnects said peripheral portions and which are axially spaced from each other, and the other element of at least one of said capacitors being the internal periphery of said bearing which is also electrically conductive, whereby any metallic contact between said peripheral portions of said bearing and shaft results in a short-circuit of the capacitor established by said peripheral portions and a substantial decrease in the total capacitance across said series connected capacitors as measured by said detector.

2. Apparatus for monitoring bearings as defined in claim 1 wherein one of said two series connected capacitors is established by one of said peripheral portions of said shaft and an annulus of electrically conductive material surrounding said peripheral portion of said shaft in radially spaced relation thereto.

3. Apparatus for monitoring bearings as defined in claim 1 wherein at least three capacitors and three bearings are included, each said capacitor being comprised of a peripheral portion of said shaft and a corresponding peripheral portion of one of said bearings, and which further includes switching means for connecting one of said capacitors in series with one of the other two capacitors.

4. Apparatus for monitoring bearings as defined in claim 1 wherein said two series connected capacitors are comprised of axially spaced peripheral portions of said shaft and the internal peripheries of axially spaced bearings.

5. Apparatus for monitoring bearings as defined in claim 4 wherein one of said bearings is a thrust bearing and the other is a journal bearing.

6. Apparatus for monitoring bearings as defined in claim 4 wherein both of said bearings are journal bearings.

7. Apparatus for monitoring bearings as defined in claim 1 wherein a plurality of bearings are provided for said shaft, said bearings including a plurality of journal bearings spaced along said shaft and a thrust bearing associated with a flange at the end of said shaft, the internal peripheries of said journal bearings and said thrust bearing together with said corresponding peripheral portions of shaft establishing three electrically paralleled capacitors, said paralleled capacitors being connected in series with another capacitor established by the peripheral surface of said shaft flange and an electrically conductive annulus arranged in radially spaced relation to said peripheral surface.

8. Apparatus for monitoring bearings as defined in claim 1 wherein a plurality of bearings are provided for said shaft, said bearings including at least two journal bearings spaced along said shaft and a thrust bearing associated with a flange at the end of said shaft, the peripheries of said journal bearings and said thrust bearing together with corresponding peripheral portions of said shaft establishing individual capacitors, the capacitors correlated to said thrust bearing and one of said journal bearings being connected in parallel, and said paralleled capacitors being connected in series with the capacitor correlated to the other journal bearing.

9. Apparatus for monitoring bearings as defined in claim 1 wherein a plurality of bearings are provided for said shaft and each said bearing constitutes one of said capacitors, said shaft and bearings being located within a casing and at least one of said bearings is electrically insulated relative to said casing.

References Cited in the file of this patent

UNITED STATES PATENTS

| | | |
|---|---|---|
| 1,686,365 | Becker | Oct. 2, 1928 |
| 2,167,265 | Honnef et al. | July 25, 1939 |
| 2,787,750 | Jones | Apr. 2, 1957 |
| 3,000,101 | Giardino et al. | Sept. 19, 1961 |

FOREIGN PATENTS

| | | |
|---|---|---|
| 1,154,972 | France | Apr. 18, 1958 |